US012227818B2

(12) United States Patent
Azuma et al.

(10) Patent No.: US 12,227,818 B2
(45) **Date of Patent: *Feb. 18, 2025**

(54) AMORPHOUS ALLOY RIBBON, PRODUCTION METHOD THEREFOR, AND AMORPHOUS ALLOY RIBBON PIECE

(71) Applicants: PROTERIAL, LTD., Tokyo (JP); METGLAS INC., Conway, SC (US)

(72) Inventors: Daichi Azuma, Tokyo (JP); Naoki Ito, Conway, SC (US)

(73) Assignees: Proterial, Ltd., Tokyo (JP); Metglas, Inc., Conway, SC (US)

(*) Notice: Subject to any disclaimer, the term of this patent is extended or adjusted under 35 U.S.C. 154(b) by 216 days.

This patent is subject to a terminal disclaimer.

(21) Appl. No.: 16/626,514

(22) PCT Filed: Jul. 3, 2018

(86) PCT No.: PCT/JP2018/025278

§ 371 (c)(1),
(2) Date: Dec. 24, 2019

(87) PCT Pub. No.: WO2019/009309

PCT Pub. Date: Jan. 10, 2019

(65) Prior Publication Data

US 2021/0310097 A1 Oct. 7, 2021

Related U.S. Application Data

(60) Provisional application No. 62/528,450, filed on Jul. 4, 2017.

(51) Int. Cl.

*C21D 9/52* (2006.01)
*C21D 6/00* (2006.01)

(Continued)

(52) U.S. Cl.

CPC ............... *C21D 9/52* (2013.01); *C21D 6/008* (2013.01); *C22C 1/11* (2023.01); *C22C 45/02* (2013.01);

(Continued)

(58) Field of Classification Search

CPC ..... C22C 1/002; C22C 2200/02; H01F 1/153; C21D 2201/03; C21D 9/52

See application file for complete search history.

(56) References Cited

U.S. PATENT DOCUMENTS

| | | | | |
|---|---|---|---|---|
| 1,747,145 A * | 2/1930 | Schumacher | C21D 9/52 | 148/641 |
| 4,026,729 A * | 5/1977 | Nakaoka | C21D 9/52 | 148/661 |

(Continued)

FOREIGN PATENT DOCUMENTS

| | | |
|---|---|---|
| DE | 3886955 T2 | 4/1994 |
| JP | 61179819 A * | 8/1986 |

(Continued)

OTHER PUBLICATIONS

Wakeda. Controlled rejuvenation of amorphous metals with thermal processing. Scientific Reports. Published May 26, 2015. 5: 10545. (Year: 2015).*

(Continued)

*Primary Examiner* — Paul A Wartalowicz
*Assistant Examiner* — Stephani Hill
(74) *Attorney, Agent, or Firm* — POLSINELLI PC; Ron Galant

(57) ABSTRACT

A method of producing an amorphous alloy ribbon having a composition of Fe100-a-bBaSibCc (13.0 atom %≤a≤16.0 atom %, 2.5 atom %≤b≤5.0 atom %, 0.20 atom %≤c≤0.35 atom %, and 79.0 atom %≤(100-a-b)≤83.0 atom %) includes: preparing an alloy ribbon; and, in a state in which (Continued)

the alloy ribbon is tensioned with a tensile stress of from 5 MPa to 100 MPa, increasing a temperature of the alloy ribbon to from 410° C. to 480° C., at an average temperature increase rate of from 50° C./sec to less than 800° C./sec, and decreasing a temperature of the thus heated alloy ribbon to a temperature of a heat transfer medium for temperature-decreasing, at an average temperature decrease rate of from 120° C./sec to less than 600° C./sec, wherein the temperature increase and decrease are performed by contacting the traveling alloy ribbon with a heat transfer medium.

7 Claims, 3 Drawing Sheets

(51) Int. Cl.
*C22C 1/11* (2023.01)
*C22C 45/02* (2006.01)
*H01F 1/153* (2006.01)

(52) U.S. Cl.
CPC ......... *H01F 1/153* (2013.01); *C21D 2201/03* (2013.01); *C22C 2200/02* (2013.01)

(56) References Cited

U.S. PATENT DOCUMENTS 4,288,260 A 9/1981 Senno
4,482,402 A * 11/1984 Taub .................. H01F 1/15341 29/605
4,782,994 A 11/1988 Raybould et al.
5,650,023 A * 7/1997 Hasegawa ........... H01F 1/15316 148/304
5,786,762 A * 7/1998 Liu ......................... H01L 41/20 148/108
2003/0226618 A1* 12/2003 Herzer ..................... C21D 9/56 148/121
2006/0000524 A1 1/2006 Ogawa et al.
2009/0242082 A1 10/2009 Imai et al.
2010/0040503 A1* 2/2010 Yoshizawa ............... C21D 6/00 420/82
2012/0049992 A1* 3/2012 Azuma ............... H01F 41/0226 336/213
2013/0139929 A1* 6/2013 Francoeur ............... C22C 38/02 148/111
2014/0104024 A1* 4/2014 Herzer .................. C22C 33/003 335/297
2016/0186287 A1* 6/2016 Evertz .................. C21D 8/0236 148/541
2017/0096721 A1 4/2017 Francoeur et al.
2018/0334737 A1 11/2018 Kuroki

FOREIGN PATENT DOCUMENTS

JP H04-500837 A 2/1992
JP 05049426 A * 3/1993
JP 05269964 A * 10/1993
JP 06033143 A * 2/1994
JP 09052154 A * 2/1997
JP 2006-310787 A 11/2006
JP 2006-312777 A 11/2006
JP A S54-083622 A 11/2008
JP 2013-511617 A 4/2013
WO 2008/133301 A1 11/2008
WO 2015/046140 A1 4/2015
WO 2016/002945 A1 1/2016
WO 2016084741 A1 7/2017
WO WO-2017150440 A1 * 9/2017 ............. C22C 45/02

OTHER PUBLICATIONS

Kumar et al. Critical fictive temperature for plasticity in metallic glasses. Nature Communications. Published Feb. 26, 2013. 1-6. (Year: 2013).*
Francoeur et al. Continuous-annealing method for producing a flexible, curved, soft magnetic amorphous alloy ribbon. Journal of Applied Physics 111, 07A309 (2012) (Year: 2012).*
WO 2017/150440 machine translation (Year: 2017).*
JP H06-033143 machine translation (Year: 1994).*
JP S61-179819 machine translation (Year: 1986).*
JP H05-269964 machine translation (Year: 1993).*
Indian Office Action issued on Jun. 23, 2021 for corresponding Indian Application No. 202017003977, 5 pages.
Lashgari et al., "Composition dependence of the microstructure and soft magnetic properties of Fe-based amorpous/nanocrystalline alloys: A review study", Journal of Non-Crystalline Solids, 391, 2014, pp. 61-82.
Office Action for German Pat. App. No. 11 2018 003 473.9 issued on Oct. 2, 2020.

* cited by examiner

AMORPHOUS ALLOY RIBBON, PRODUCTION METHOD THEREFOR, AND AMORPHOUS ALLOY RIBBON PIECE

TECHNICAL FIELD

The present disclosure relates to an amorphous alloy ribbon, a method of producing the same, and an amorphous alloy ribbon piece.

BACKGROUND ART

Silicon steels, ferrites, Fe-based amorphous alloys, and Fe-based nanocrystalline alloys are known as magnetic materials of cores that are used in, for example, transformers, reactors, choke coils, motors, noise suppression components, laser power sources, pulse power magnetic components for accelerators, and power generators.

As the cores, for example, toroidal cores (wound cores), which are produced using an Fe-based amorphous alloy or an Fe-based nanocrystalline alloy, are known (see, for example, Patent Documents 1 and 2).

As a method of continuously in-line annealing a ribbon in a curved shape so as to improve its magnetic properties without making the ribbon brittle, a method in which an amorphous alloy ribbon in a tensioned state is heated at a rate faster than $10^{3}$° C./sec and subsequently cooled at a rate faster than $10^{3}$° C./sec has been disclosed (see, for example, Patent Document 3).

Patent Document 1: Japanese Patent Application Laid-Open (JP-A) No. 2006-310787

Patent Document 2: International Publication (WO) No. 2015/046140

Patent Document 3: Japanese National Phase Publication (JP-A) No. 2013-511617

SUMMARY OF THE INVENTION

Technical Problem

In Patent Document 3, increasing and decreasing of temperature are performed at a rate faster than $10^{3}$° C./sec in order to suppress embrittlement caused by high-temperature annealing. It is described that, in order to perform rapid increasing or decreasing of temperature of the amorphous alloy ribbon, a tightly adhered state is maintained between the amorphous alloy ribbon and at least two roller-form heat transfer media for increasing and decreasing of temperatures (a hot roller and a cold roller, respectively), whereby the heat transfer therebetween is improved and the increasing and the decreasing of temperature are completed in a short time. Since the at least two roller-form heat transfer media and the alloy ribbon tightly adhere with each other during a thermal treatment (increasing or decreasing of temperature), a stress caused by a curvature of a roller radius remains on the alloy ribbon. The alloy ribbon needs to be deformed in the production of a wound magnetic core therefrom, and it is presumed that the magnetic properties are deteriorated by the stress remaining on the alloy ribbon.

Establishment of a technology that alleviates embrittlement of an amorphous alloy ribbon even when the rates of increasing and decreasing of temperatures of the amorphous alloy ribbon are reduced without adopting such a cooling method based on winding on rollers as described above would make it possible to select a variety of cooling methods other than a roll cooling method.

Moreover, in Patent Document 3, it is presumably difficult to attain excellent intrinsic magnetic properties when a core is obtained by disposing an alloy ribbon as a planar (flat) plate.

The present disclosure was made in view of the above-described circumstances.

An object of the embodiments of the present disclosure is to provide an amorphous alloy ribbon that not only exhibits excellent magnetic properties in a planar state after a thermal treatment but also has cuttability; a method of producing the same; and an amorphous alloy ribbon piece.

The present disclosure includes the embodiments as set forth below.

<1> A method of producing an amorphous alloy ribbon having a composition represented by the following Compositional Formula (A), the method comprising the steps of:

preparing an amorphous alloy ribbon having a composition consisting of Fe, Si, B, C, and unavoidable impurities;

increasing a temperature of the amorphous alloy ribbon to a target maximum temperature that is in a range of from 410° C. to 480° C., at an average temperature increase rate of from 50° C./sec to less than 800° C./sec, in a state in which the amorphous alloy ribbon is tensioned with a tensile stress of from 5 MPa to 100 MPa; and decreasing a temperature of the thus heated amorphous alloy ribbon from the target maximum temperature to a temperature of a heat transfer medium for temperature-decreasing, at an average temperature decrease rate of from 120° C./sec to less than 600° C./sec, in a state in which the amorphous alloy ribbon is tensioned with a tensile stress of from 5 MPa to 100 MPa, the increase of temperature in the temperature increasing step and the decrease of a temperature in the temperature decreasing step being performed by allowing the amorphous alloy ribbon to travel in a tensioned state and bringing the amorphous alloy ribbon that is traveling into contact with a heat transfer medium.

$$Fe_{100-a-b}B_aSi_bC_c \quad \text{Compositional Formula (A)}$$

In Compositional Formula (A), a and b each represent an atomic fraction in the composition and satisfy the following respective ranges, and c represents an atomic fraction of C with respect to a total of 100.0 atom % of Fe, Si and B, and satisfies the following range:

13.0 atom %≤a≤16.0 atom %, 2.5 atom %≤b≤5.0 atom %, 0.20 atom %≤c≤0.35 atom %, and 79.0 atom %≤(100-a-b)≤83.0 atom %.

<2> The method of producing an amorphous alloy ribbon according to <1>, wherein the average temperature increase rate is from 60° C./sec to 760° C./sec, and the average temperature decrease rate is from 190° C./sec to 500° C./sec.

<3> The method of producing an amorphous alloy ribbon according to <1> or <2>, wherein, in the temperature increasing step and the temperature decreasing step, the tensile stress is from 10 MPa to 75 MPa.

<4> The method of producing an amorphous alloy ribbon according to any one of <1> to <3>, wherein the b satisfies the following range:

3.0 atom %≤b≤4.5 atom %.

<5> The method of producing an amorphous alloy ribbon according to any one of <1> to <4>, wherein the (100-a-b) satisfies the following range:

80.5 atom %≤(100-a-b)≤83.0 atom %.

<6> The method of producing an amorphous alloy ribbon according to any one of <1> to <5>, wherein the a satisfies the following range:

14.0 atom %≤a≤16.0 atom %.

<7> The method of producing an amorphous alloy ribbon according to any one of <1> to <6>, wherein a contact surface of the heat transfer medium that increases the temperature of the amorphous alloy ribbon that is traveling and a contact surface of the heat transfer medium that decreases the temperature of the amorphous alloy ribbon that is traveling are arranged in a flat plane.

<8> An amorphous alloy ribbon, having a composition represented by the following Compositional Formula (A), as well as having cuttability, and exhibiting a coercivity $H_c$ of 1.0 A/m or less:

$Fe_{100-a-b}B_aSi_bC_c$ Compositional Formula (A)

wherein, in Compositional Formula (A), a and b each represent an atomic fraction in the composition and satisfy the following respective ranges, and c represents an atomic fraction of C with respect to a total of 100.0 atom % of Fe, Si and B, and satisfies the following range:

13.0 atom %≤a≤16.0 atom %, 2.5 atom %≤b≤5.0 atom %, 0.20 atom %≤c≤0.35 atom %, and 79.0 atom %≤(100-a-b)≤83.0 atom %.

<9> The amorphous alloy ribbon according to <8>, having a brittleness code of 3 or less in terms of strip tear ductility prescribed in JIS C2534 (2017).

<10> The amorphous alloy ribbon according to <9>, having a brittleness code of 2 or smaller.

<11> The amorphous alloy ribbon according to any one of <8> to <10>, having a width of from 25 mm to 220 mm.

<12> The amorphous alloy ribbon according to any one of <8> to <11>, wherein the b satisfies the following range:

3.0 atom %≤b≤4.5 atom %.

<13> The amorphous alloy ribbon according to any one of <8> to <12>, wherein the (100-a-b) satisfies the following range:

80.5 atom %≤(100-a-b)≤83.0 atom %.

<14> The amorphous alloy ribbon according to any one of <8> to <13>, wherein the a satisfies the following range:

14.0 atom %≤a≤16.0 atom %.

<15> An amorphous alloy ribbon piece, which is a cut-out fragment of the amorphous alloy ribbon according to any one of <8> to <14>.

According to the present disclosure, an amorphous alloy ribbon that not only exhibits excellent magnetic properties in a planar state after a thermal treatment but also has cuttability, a method of producing the same, and an amorphous alloy ribbon piece are provided.

DESCRIPTION OF EMBODIMENTS

Mode for Carrying Out the Invention

Figure 1:
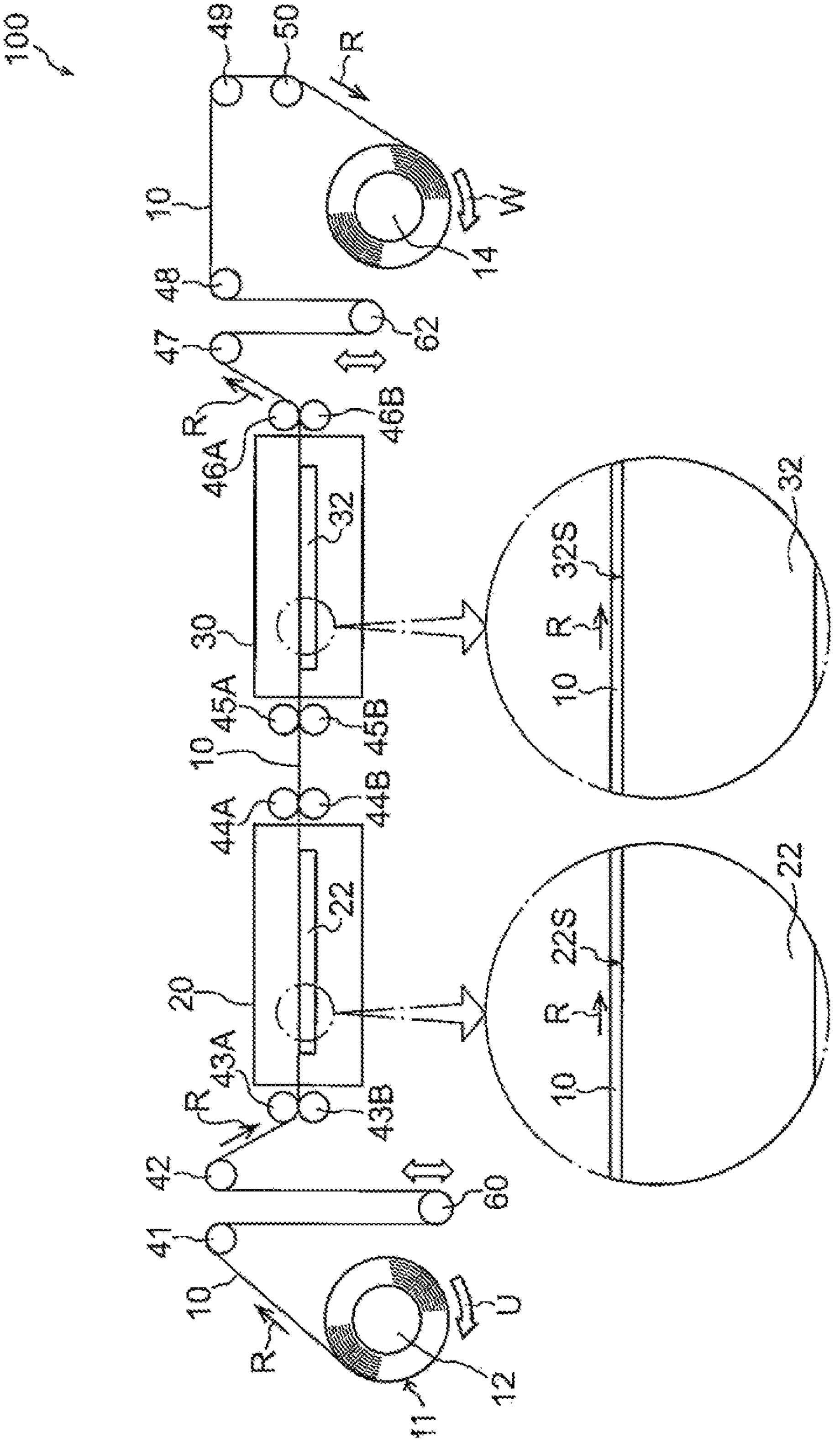
FIG. 1 is a schematic cross-sectional view illustrating one example of an in-line annealing apparatus used for the production of an amorphous alloy ribbon.

The amorphous alloy ribbon of the present disclosure (hereinafter, also simply referred to as "alloy ribbon"), a method of producing the same, and an amorphous alloy ribbon piece, will now be described in detail.

In the present specification, those numerical ranges provided by the expression of "from . . . to . . . " each denote a range that includes the numerical values stated before and after "to" as the lower limit value and the upper limit value, respectively.

Further, the term "step" used herein encompasses not only discrete steps but also steps that cannot be clearly distinguished from other steps, as long as the intended purpose of the step is achieved.

The term "amorphous alloy ribbon" used herein means an elongated alloy ribbon.

The term "amorphous alloy ribbon piece" used herein means a sheet-form amorphous alloy ribbon cut out from an (elongated) amorphous alloy ribbon, which can be preferably a strip-shaped amorphous alloy ribbon piece or an amorphous alloy ribbon piece cut out at an angle of from 30° to 60° with respect to the longitudinal direction (at an angle of from −15° to +15° with respect to 45°).

In the present specification, the content ratios (atom %) of iron (Fe), boron (B) and silicon (Si) mean the content ratios of the respective elements, taking a total amount of Fe, B and Si as 100 atom %. The content ratio (atom %) of carbon (C) means a content ratio with respect to a total of 100.0 atom % of Fe, Si and B.

It is noted here that "100-a-b" representing the content ratio of Fe may include, for example, unavoidable impurities containing at least one element selected from the group consisting of Nb, Mo, V, W, Mn, Cr, Cu, P, and S.

<Amorphous Alloy Ribbon and Amorphous Alloy Ribbon Piece>

The amorphous alloy ribbon of the present disclosure has a composition represented by the below-described Compositional Formula (A) as well as cuttability, and exhibits coercivity $H_c$ in a range of 1.0 A/m or less.

The amorphous alloy ribbon of the present disclosure has both satisfactory magnetic properties and satisfactory cuttability, i.e., suppression of embrittlement.

The amorphous alloy ribbon piece of the present disclosure is a fragment of the amorphous alloy ribbon cut out at a desired size.

It is noted here that the descriptions pertaining to the composition of the amorphous alloy ribbon also apply to the amorphous alloy ribbon piece cut out from the (elongated) amorphous alloy ribbon.

The amorphous alloy ribbon of the present disclosure has a composition represented by the below-described Compositional Formula (A).

Further, an amorphous alloy ribbon piece having the composition represented by Compositional Formula (A) is produced by subjecting, to a thermal treatment, the amorphous alloy ribbon having the composition represented by Compositional Formula (A), and subsequently cutting the thus thermal-treated amorphous alloy ribbon.

A preferable embodiment of the thermal treatment is one that has the "temperature-increasing" and "temperature-decreasing step" in the below-described production method of the present disclosure.

$Fe_{100-a-b}B_aSi_bC_c$ Compositional Formula (A)

In Compositional Formula (A), a and b each represent an atomic fraction in the composition and satisfy the following respective ranges, and c represents an atomic fraction of C with respect to a total of 100.0 atom % of Fe, Si and B, and satisfies the following range:

13.0 atom %≤a≤16.0 atom %, 2.5 atom %≤b≤5.0 atom %, 0.20 atom %≤c≤0.35 atom %, and 79.0 atom %≤(100-a-b)≤83.0 atom %.

The above-described Compositional Formula (A) will now be described in more detail.

In Compositional Formula (A), the atomic fraction (atom %) of Fe is determined as "100-a-b". Fe, which is a main component of the amorphous alloy ribbon, is a primary element that determines the magnetic properties.

The "100-a-b" representing the content ratio of Fe may include, for example, unavoidable impurities containing at least one element selected from the group consisting of Nb, Mo, V, W, Mn, Cr, Cu, P, and S. The content of the unavoidable impurities is preferably in a range of 1 atom % or less.

The amorphous alloy ribbon and the amorphous alloy ribbon piece according to the present disclosure both have a composition represented by the above-described Compositional Formula (A).

In other words, the amorphous alloy ribbon of the present disclosure (a thin section of an Fe-based amorphous alloy) is an Fe-based amorphous alloy ribbon (a thin section of an Fe-based amorphous alloy) that contains not less than 79.0 atom % [=(100-a-b)=(100-16.0-5.0)] of Fe (including unavoidable impurities). By allowing the alloy composition to have a relatively high Fe content ratio, embrittlement can be suppressed more effectively.

The value of "100-a-b" is preferably 79.0 or larger, more preferably 80.5 or larger, and still more preferably 81.0 or larger.

The upper limit value of "100-a-b" (atom %), which is determined in accordance with a and b, is 83.0 or smaller.

In the above-described range, the content ratio "100-a-b" preferably satisfies the following range:

80.5 atom %≤100-a-b≤83.0 atom %.

In Compositional Formula (A), the atomic fraction a of B is from 13.0 atom % to 16.0 atom %. In the amorphous alloy ribbon, B has a function of stably maintaining an amorphous state.

In the present disclosure, B effectively exhibits this function with its atomic fraction a being 13.0 atom % or higher. In addition, since the atomic fraction a of 16.0 atom % or lower ensures the Fe content, the saturation magnetic flux density B, of the amorphous alloy ribbon and that of the amorphous alloy ribbon piece can be improved, leading to an increased $B_{80}$.

Particularly, the atomic fraction a of B preferably satisfies the following range:

14.0 atom %≤a≤16.0 atom %.

In Compositional Formula (A), the atomic fraction b of Si is from 2.5 atom % to 5.0 atom %.

Si has functions of increasing a crystallization temperature of the amorphous alloy ribbon and forming a surface oxide film.

In the present disclosure, Si effectively exhibits these functions with the atomic fraction b being 2.5 atom % or higher. Accordingly, the thermal treatment can be performed at a higher temperature. In addition, since the atomic fraction b of 5.0 atom % or lower ensures the Fe content, the saturation magnetic flux density $B_s$ of the amorphous alloy ribbon is improved.

The atomic fraction b of Si preferably satisfies the following range:

3.0 atom %≤b≤4.5 atom %.

In Compositional Formula (A), the atomic fraction c of C is from 0.20 atom % to 0.35 atom %. By incorporating C (carbon) into the composition of the Fe—B—Si-based amorphous alloy ribbon, the space factor of the ribbon is improved. The reason for this is believed to be because the surface flatness of the ribbon is further improved by an addition of C.

The atomic fraction c of C is preferably in a range of from 0.23 atom % to 0.30 atom %.

The amorphous alloy ribbon of the present disclosure has favorable magnetic flux densities and coercivity as its magnetic properties.

The amorphous alloy ribbon of the present disclosure has high magnetic flux densities ($B_{80}$ and $B_{800}$). The $B_{80}$ is the magnetic flux density that is measured when the amorphous alloy ribbon is magnetized in a magnetic field of 80 A/m, and the $B_{800}$ is the magnetic flux density that is measured when the amorphous alloy ribbon is magnetized in a magnetic field of 800 A/m.

The magnetic flux density $B_{80}$ of the amorphous alloy ribbon of the present disclosure is preferably 1.45 T or higher, and more preferably 1.50 T or higher. When the magnetic flux density $B_{80}$ is 1.45 T or higher, a core produced from the amorphous alloy ribbon exhibits soft magnetic properties, and various soft magnetic application components can be obtained.

In the amorphous alloy ribbon of the present disclosure, the coercivity ($H_c$) is controlled to be low.

The coercivity is preferably 1.0 A/m or less, and more preferably 0.8 A/m or less. When the coercivity is 1.0 A/m or less, the hysteresis loss is reduced, so that a core produced from the amorphous alloy ribbon has a low iron loss.

The magnetic flux densities ($B_{80}$ and $B_{800}$) and the coercivity ($H_c$) are values determined using a direct-current magnetization analyzer SK110 (manufactured by METRON, Inc.).

The $B_{80}$ is a value measured using the direct-current magnetization analyzer SK110 at a magnetic field intensity of 80 A/m, and the $B_{800}$ is a value measured using the direct-current magnetization analyzer SK110 at a magnetic field intensity of 800 A/m.

The coercivity ($H_c$) is a value determined from a hysteresis curve measured at a magnetic field intensity of 800 A/m.

In the amorphous alloy ribbon of the present disclosure, embrittlement is suppressed even after the amorphous alloy ribbon is thermal-treated in a temperature range where the target maximum temperature is 410° C. or higher. As brittleness indices which represent the degree of embrittlement of the amorphous alloy ribbon, cuttability, a 180°-bending test and a tearing test are known as described below.

The amorphous alloy ribbon of the present disclosure has cuttability. The expression of having "cuttability" used herein means that the amorphous alloy ribbon can be cut with scissors.

The cuttability serves as a brittleness index that represents the degree of embrittlement of the amorphous alloy ribbon. Specifically, the cuttability is evaluated based on whether or not the alloy ribbon is substantially linearly divided and a non-linear broken part is 5% or less of the whole cut dimensions when the alloy ribbon is cut using a cutting tool that cuts an object by pinching it between two blades (e.g., scissors).

In addition to the above-described cuttability, a 180°-bending test may be used as a second index for brittleness. It is evaluated based on visual observation of whether or not a broken part is generated in a bent portion of the alloy ribbon made by bending the alloy ribbon by 180°. A case of bending the alloy ribbon with its glossy surface (the surface freely solidified during casting) facing the outside and a case of bending the alloy ribbon with its non-glossy surface (the surface of the side coming into contact with a cooling roll during casting) facing the outside may yield different evaluation results.

Moreover, as a third index for brittleness, the strip tear ductility may be evaluated by a tearing test. Specifically, the strip tear ductility is represented by "brittleness code" prescribed in JIS C2534 (2017).

In JIS C2534 (2017), it is not prescribed that a width of an alloy ribbon to be tested should be less than 142.2 mm; however, from the description "at 12.7 mm and 25.4 mm in the width direction from the respective cast edges of the test piece, as well as at five spots in the widthwise central portion", it is thought that an equivalent evaluation can be made as long as the position of 12.7 mm+25.4 mm=38.1 mm is in the central part, i.e. the width of the alloy ribbon is not less than 76.2 mm (=38.1 mm×2).

Meanwhile, when the alloy ribbon has a width of 20 mm or greater as in the present disclosure but less than 76.2 mm as described above, the following evaluation method is employed.

That is, a total number of brittle spots of each test piece is evaluated in accordance with the following (1) or (2), and the "brittleness code" is determined based on the thus determined total number of brittle spots. As for the "brittleness code" index, a smaller value indicates a lower degree of embrittlement. The term "brittle spot" used herein refers to a region where, when an amorphous ribbon was torn, the amorphous ribbon was damaged in the form of a change in the tearing path or direction, separation of a broken piece, or the like.

(1) When the width of the alloy ribbon is from 20 mm to less than 508 mm, the numbers of brittle spots observed at one position of the ribbon widthwise central portion of each of five test pieces are summed up.

(2) When the width of the alloy ribbon is from 50.8 mm to less than 762 mm, the numbers of brittle spots observed at three positions, which are positions at 12.7 mm from the respective cast edges in the width direction and a position in the widthwise central portion, of each of two test pieces are summed up.

The brittleness code of the strip tear ductility, which is prescribed in JIS C2534 (2017), of the amorphous alloy ribbon is preferably 3 or less, and more preferably 2 or 1.

The amorphous alloy ribbon preferably has a thickness of from 20 μm to 30 μm.

When the thickness is 20 μm or greater, the mechanical strength of the amorphous alloy ribbon is ensured, so that breakage of the amorphous alloy ribbon piece is suppressed. The thickness of the amorphous alloy ribbon is more preferably 22 μm or greater. Meanwhile, when the thickness is 30 μm or less, the amorphous alloy ribbon can attain a stable amorphous state after being cast.

The amorphous alloy ribbon has a width, which is perpendicular to the longitudinal direction, of preferably 20 mm or greater, more preferably from 20 mm to 220 mm, and still more preferably from 25 mm to 220 mm.

When the amorphous alloy ribbon has a width of 20 mm or greater, a core can be produced therefrom with good productivity. Meanwhile, when the amorphous alloy ribbon has a width of 220 mm or less, variations in the thickness and the magnetic properties along the width direction can be suppressed, so that a stable productivity is likely to be ensured.

A method of producing the above-described amorphous alloy ribbon of the present disclosure is not particularly restricted as long as it is a method by which an amorphous alloy ribbon having a composition represented by Compositional Formula (A) is produced using an amorphous alloy ribbon that has a composition including Fe, Si, B, C and unavoidable impurities, and any such production method may be selected.

Particularly, the amorphous alloy ribbon of the present disclosure is preferably produced by a method (the method of producing an amorphous alloy ribbon according to the present disclosure) including the steps of: preparing an amorphous alloy ribbon having a composition consisting of Fe, Si, B, C, and unavoidable impurities (this step is hereinafter also referred to as a "ribbon preparation"); increasing a temperature of the amorphous alloy ribbon to a target maximum temperature that is in a range of from 410° C. to 480° C., at an average temperature increase rate of from 50° C./sec to less than 800° C./sec, in a state in which the amorphous alloy ribbon is tensioned with a tensile stress of from 5 MPa to 100 MPa (this step is hereinafter also referred to as a "temperature-increasing"); and decreasing a temperature of the thus heated amorphous alloy ribbon from the target maximum temperature to a temperature of a heat transfer medium for temperature-decreasing, at an average temperature decrease rate of from 120° C./sec to less than 600° C./sec, in a state in which the amorphous alloy ribbon is tensioned with a tensile stress of from 5 MPa to 100 MPa (this step is hereinafter also referred to as a "temperature-decreasing").

$$Fe_{100-a-b}B_aSi_bC_c \qquad \text{Compositional Formula (A)}$$

The details and preferable embodiments of a, b and c in Compositional Formula (A) are as described above.

When the amorphous alloy ribbon is heated to a certain temperature or higher, structural relaxation proceeds with an amorphous phase being maintained. Further, when the amorphous alloy ribbon is heated to its crystallization temperature or higher, the amorphous alloy ribbon starts crystallizing.

The structural relaxation makes the excellent magnetic properties of the amorphous alloy ribbon more apparent. Meanwhile, embrittlement of the amorphous alloy ribbon proceeds concurrently. Conventionally, it has been considered difficult to attain excellent magnetic properties and to suppress the embrittlement at the same time.

In the amorphous alloy ribbon of the present disclosure, an alloy ribbon having the prescribed amorphous alloy composition is thermal-treated in the prescribed temperature profile (temperature increase rate, target maximum temperature, and temperature decrease rate) with the prescribed tensile stress being applied to the alloy ribbon in the longitudinal direction, whereby not only embrittlement of the alloy ribbon is suppressed but also excellent magnetic properties are attained. In addition, by the application of the tensile stress, a magnetic anisotropy can be imparted to the alloy ribbon along the longitudinal direction (casting direction).

<Ribbon Preparation>

The method of producing an amorphous alloy ribbon according to the present disclosure includes a step of preparing an amorphous alloy ribbon that has a composition including Fe, Si, B, C, and unavoidable impurities.

An amorphous alloy ribbon can be produced by a known method, such as a liquid quenching method in which a molten alloy is ejected onto an axially-rotating cooling roll. The step of preparing an amorphous alloy ribbon is not necessarily required to be a step of producing an amorphous alloy ribbon, and may be a step of simply preparing an amorphous alloy ribbon that has been previously produced.

<Temperature-Increasing>

The method of producing an amorphous alloy ribbon according to the present disclosure includes a step of increasing a temperature of the amorphous alloy ribbon to a target maximum temperature that is in a range of from 410° C. to 480° C., at an average temperature increase rate of from 50° C./sec to less than 800° C./sec, in a state in which the amorphous alloy ribbon is tensioned with a tensile stress of from 5 MPa to 100 MPa.

In this step, the amorphous alloy ribbon may be thermal-treated by any method as long as the method is capable of increasing a temperature of the amorphous alloy ribbon to the above-described target maximum temperature with the average temperature increase rate being adjusted in the above-described range.

When such a thermal treatment is performed, the amorphous alloy ribbon may be heated by bringing the amorphous alloy ribbon into contact with a heat transfer medium (which is a heat transfer medium for temperature-increasing in this step) while allowing the amorphous alloy ribbon to travel in a tensioned state.

The phrase "travel in a tensioned state" used herein refers to a state where the amorphous alloy ribbon continuously travels with a tensile stress being applied thereto. The same applies to the temperature-decreasing step.

The tensile stress applied to the amorphous alloy ribbon is in a range of from 5 MPa to 100 MPa, preferably from 10 MPa to 75 MPa, more preferably from 20 MPa to 50 MPa.

When the tensile stress is 5 MPa or higher, the resulting amorphous alloy ribbon can be imparted with a magnetic anisotropy. Meanwhile, when the tensile stress is 100 MPa or less, breakage of the amorphous alloy ribbon can be suppressed.

The tensile stress of the tensioned amorphous alloy ribbon, which is controlled by a travel control mechanism provided in an apparatus that allows the alloy ribbon to continuously travel (e.g., the below-described in-line annealing apparatus), is determined as a value obtained by dividing the tension controlled by the travel control mechanism by a cross-sectional area (width×thickness) of the alloy ribbon.

In the method of thermal-treating the amorphous alloy ribbon according to the present disclosure, a certain composition is selected, and heating is performed while controlling the average temperature increase rate of the amorphous alloy ribbon to be lower than 800° C./sec. By this, the magnetic properties and the embrittlement resistance can both be satisfied at the same time. By performing the thermal treatment at a high temperature for a short period with a tension being applied to the amorphous alloy ribbon, favorable magnetic properties can be obtained.

For the similar reasons as described above, the average temperature increase rate is from 50° C./sec to less than 800° C./sec, and preferably from 60° C./sec to 760° C./sec.

The "average temperature increase rate" herein means a value obtained by dividing a difference between the temperature of the amorphous alloy ribbon prior to the temperature increasing (e.g., before the amorphous alloy ribbon is brought into contact with a heat transfer medium as described below) and the target maximum temperature of the amorphous alloy ribbon (=temperature of the heat transfer medium for temperature-increasing) by a duration (seconds) for which the amorphous alloy ribbon is in contact with the heat transfer medium.

Specifically, for example, in a case of the in-line annealing apparatus illustrated in FIG. 1, the average temperature increase rate is determined by dividing a difference between the ribbon temperature measured using a radiation thermometer at 10 mm upstream of an inlet of a heating chamber 20 in the traveling direction of the amorphous alloy ribbon (the temperature of the amorphous alloy ribbon prior to the temperature increasing, which is generally a room temperature (from 20° C. to 30° C.)) and the temperature of a heat transfer medium for temperature-increasing (=target maximum temperature, e.g., 460° C.) by a duration (seconds) for which the amorphous alloy ribbon is in contact with the heat transfer medium for temperature-increasing. It is noted here that, when it is difficult to measure the ribbon temperature using a radiation thermometer at 10 mm upstream of the inlet of the heating chamber, or when the room temperature is unclear, the ribbon temperature can be set at 25° C.

The "in-line annealing apparatus" herein refers to, for example, an apparatus that, as illustrated in FIGS. 1 to 4, carries out an in-line annealing process in which the thermal treatment including the temperature-increasing and the temperature-decreasing (cooling) is continuously performed on an elongated amorphous alloy ribbon from an unwinding roll to a winding roll.

A temperature of the heat transfer medium for temperature-increasing is preferably adjusted to be from 410° C. to 480° C.

In this step, the amorphous alloy ribbon is heated to a target maximum temperature of from 410° C. to 480° C. By applying a tension to the amorphous alloy ribbon in this temperature range, a magnetic anisotropy can be provided in the longitudinal direction of the ribbon.

The target maximum temperature is the same as the temperature of the heat transfer medium for temperature-increasing.

The "temperature of the heat transfer medium for temperature-increasing" and the "target maximum temperature" are measured by a thermocouple arranged on the surface of the heat transfer medium for temperature-increasing with which the alloy ribbon comes into contact.

In the method of producing an amorphous alloy ribbon according to the present disclosure, the target maximum temperature in the thermal treatment is 410° C. or higher. In other words, embrittlement of the amorphous alloy ribbon of the present disclosure is suppressed even after the thermal treatment performed in a temperature range where the target maximum temperature is 410° C. or higher. Further, the target maximum temperature in the thermal treatment of the amorphous alloy ribbon of the present disclosure is 480° C. or lower. When the target maximum temperature in the thermal treatment of the amorphous alloy ribbon is lower than 410° C. or higher than 480° C., the coercivity ($H_c$) exceeds 1.0 A/m, making it difficult to obtain excellent magnetic properties. In other words, by controlling the target maximum temperature in the thermal treatment to be from 410° C. to 480° C. as described above, not only embrittlement is suppressed but also excellent magnetic properties (low coercivity) are attained.

It is noted here that, in a case in which the average temperature increase rate is 200° C./sec or higher, the brittleness code value tend to be small when a target maximum temperature of lower than 450° C. Also in a case in which the average temperature increase rate is 300° C./sec or higher, or 500° C./sec or higher, the brittleness code value tend to be small when a target maximum temperature of lower than 450° C.

An embodiment is preferable in which a temperature of the ribbon is increased with the ribbon being suctioned from the heat transfer medium side to increase the degree of contact between the ribbon and the heat transfer medium preferable. In this case, the heat transfer medium has suction holes on its surface coming into contact with the ribbon, and the ribbon may be vacuum-suctioned through the suction holes and thereby adsorbed onto the heat transfer medium surface having the suction holes. As a result, the contact of the alloy ribbon with the heat transfer medium is improved, making it easier to increase the temperature of the alloy ribbon and to adjust the temperature increase rate.

Moreover, in this step, after the temperature increasing, the temperature of the amorphous alloy ribbon may be maintained for a certain period on the heat transfer medium.

<Temperature-Decreasing>

Next, the method of producing an amorphous alloy ribbon according to the present disclosure includes the step of decreasing a temperature of the amorphous alloy ribbon, which has been heated in the above-described temperature-increasing, from the target maximum temperature to a temperature of a heat transfer medium for temperature-decreasing, at an average temperature decrease rate of from 120° C./sec to less than 600° C./sec, in a state in which the amorphous alloy ribbon is tensioned with a tensile stress of from 5 MPa to 100 MPa.

This step may be performed by any method as long as the method is capable of decreasing a temperature of the amorphous alloy ribbon to the temperature of the heat transfer medium for temperature-decreasing with the average temperature decrease rate being adjusted in the above-described range.

In a treatment for the temperature-decreasing, a temperature of the amorphous alloy ribbon may be decreased by bringing the amorphous alloy ribbon into contact with a heat transfer medium (a heat transfer medium for temperature-decreasing in this step) while allowing the amorphous alloy ribbon to travel in a tensioned state.

The tensile stress applied to the amorphous alloy ribbon is, as in the temperature-increasing, in a range of from 5 MPa to 100 MPa, preferably from 10 MPa to 75 MPa, and more preferably from 20 MPa to 50 MPa.

When the tensile stress is 5 MPa or higher, the resulting amorphous alloy ribbon can be imparted with a magnetic anisotropy. Meanwhile, when the tensile stress is 100 MPa or less, breakage of the amorphous alloy ribbon can be suppressed.

As described above, the tensile stress of the tensioned amorphous alloy ribbon, which is controlled by a travel control mechanism provided in an apparatus that allows the alloy ribbon to continuously travel (e.g., the below-described in-line annealing apparatus), is determined as a value obtained by dividing the tension controlled by the travel control mechanism by a cross-sectional area (width×thickness) of the alloy ribbon.

The temperature of the heat transfer medium for temperature-decreasing is preferably in a range of 200° C. or lower.

The "temperature of the heat transfer medium for temperature-decreasing" herein refers to the temperature to which the temperature of the amorphous alloy ribbon is decreased in this step, and may be set as appropriate to be, for example, 200° C., 150° C., 100° C., or a room temperature (e.g., 20° C.).

The "temperature of the heat transfer medium for temperature-decreasing" is a temperature measured by a thermocouple arranged on a surface of the heat transfer medium for temperature-decreasing that comes into contact with the alloy ribbon.

For the similar reasons as described above, the average temperature decrease rate is preferably from 150° C./sec to less than 600° C./sec, more preferably from 190° C./sec to less than 600° C./sec, and still more preferably from 190° C./sec to 500° C./sec.

The "average temperature decrease rate" herein means a value obtained by, for example, dividing a difference between the target maximum temperature of the amorphous alloy ribbon (=the temperature of the heat transfer medium for temperature-increasing) and the temperature of the heat transfer medium for temperature-decreasing by a duration (seconds) from a point when the amorphous alloy ribbon leaves the heat transfer medium for temperature-increasing to a point when the amorphous alloy ribbon leaves the heat transfer medium for temperature-decreasing when the temperature of the amorphous alloy ribbon is decreased from the target maximum temperature to the temperature of the heat transfer medium for temperature-decreasing.

Specifically, for example, in the case of the in-line annealing apparatus illustrated in FIG. 1, the average temperature decrease rate is determined by dividing a difference between the temperature of the heat transfer medium for temperature-increasing (heating plate 22 in FIG. 1) (=target maximum temperature) and the temperature of the heat transfer medium for temperature-decreasing (cooling plate 32 in FIG. 1) in the traveling direction of the amorphous alloy ribbon by a duration (seconds) from a point when the amorphous alloy ribbon leaves the heat transfer medium for temperature-increasing to a point when the amorphous alloy ribbon leaves the heat transfer medium for temperature-decreasing.

In this case, the in-line annealing apparatus has a single cooling chamber; however, when the in-line annealing apparatus includes plural cooling chambers that are connected to one another (the most upstream cooling chamber may be hereinafter referred to as "first cooling chamber", and cooling chambers on the downstream of the first cooling chamber may be hereinafter referred to as "second cooling chamber" and the like), the average temperature decrease rate is defined as an average temperature decrease rate in the (first) cooling chamber arranged on the most upstream side in the traveling direction of the amorphous alloy ribbon (a value obtained by dividing a difference between the target maximum temperature and the temperature of a first heat transfer medium for temperature-decreasing by a duration (seconds) from a point when the amorphous alloy ribbon leaves the heat transfer medium for temperature-increasing to a point when the amorphous alloy ribbon leaves the first heat transfer medium for temperature-decreasing).

Examples of the heat transfer media that are used in the above-described temperature-increasing and temperature-decreasing include plates and twin rolls.

Examples of the materials of the heat transfer media include copper, copper alloys (e.g., bronze and brass), aluminum, iron, and iron alloys (e.g., stainless steel). Thereamong, copper, a copper alloy or aluminum is preferable because of its high thermal conductivity coefficient (heat transfer coefficient).

A plating treatment, such as Ni plating or Ag plating, may be performed on the heat transfer media.

A method for the cooling may be one in that the alloy ribbon is cooled by exposure to the air after being removed from the heat transfer medium for temperature-increasing; however, from the standpoint of the temperature-decreasing rate, it is preferable to force-cool the alloy ribbon using a cooler. The cooler may be a noncontact-type cooler which cools the ribbon by blowing cold air thereto, or may be a contact-type cooler, which is a heat transfer medium the temperature of which is lowered and to, for example, 200° C. or lower and which is made to contact with the ribbon to decrease a temperature of the ribbon. The heat transfer medium may have suction holes on the surface coming into contact with the ribbon, and the ribbon may be vacuum-suctioned through the suction holes and thereby adsorbed onto the heat transfer medium surface having the suction holes. As a result, the contact of the alloy ribbon with the heat transfer medium is improved, making it easier to cool the alloy ribbon and to adjust the temperature-decreasing rate.

When a heat transfer medium is used for temperature-decreasing, it is preferable that the alloy ribbon heated in the temperature-increasing is removed from the heat transfer medium used in the temperature-increasing and then the temperature of the alloy ribbon is decreased. In this case, the cooler may be a noncontact-type cooler that cools the ribbon by blowing a cold air thereto. From the standpoint of the temperature-decreasing rate of the alloy ribbon, an embodiment of using a contact-type cooler that is a heat transfer medium which lowers its temperature to 100° C. or lower to cool the alloy ribbon in contact with the heat transfer medium is preferable. As the heat transfer medium, a heat transfer medium which is similar to one that can be used in the temperature-increasing may be employed.

In an embodiment of using a heat transfer medium to decrease the temperature of the alloy ribbon to the temperature of the heat transfer medium for temperature-decreasing by making the alloy ribbon to be in contact with the heat transfer medium, it is easy to perform the temperature-decreasing continuously from the temperature-increasing. The alloy ribbon is brought into contact with the heat transfer medium such that the average temperature decrease rate from the target maximum temperature in the temperature-increasing to the temperature of the heat transfer medium for temperature-decreasing is from 120° C./sec to less than 600° C./sec.

In this case, in the production of the amorphous alloy ribbon of the present disclosure, it is preferable that the contact surface of the heat transfer medium (heat transfer medium for temperature-increasing) used for temperature-increasing the traveling amorphous alloy ribbon and the contact surface of the heat transfer medium (heat transfer medium for temperature-decreasing) used for temperature-decreasing the traveling amorphous alloy ribbon are each arranged in a planar state, and it is more preferable that these contact surfaces each in a planar state are arranged in the same plane. By arranging the contact surfaces each in a planar state on the same plane, it becomes further easier to continuously perform the temperature-decreasing following to the temperature-increasing.

The method of producing an amorphous alloy ribbon according to the present disclosure is preferably carried out using the in-line annealing apparatus illustrated in FIGS. 1 to 4, which includes a heating chamber and a cooling chamber.

As illustrated in FIG. 1, an in-line annealing apparatus 100 includes: an unwinding roller 12 (an unwinding unit) which unwinds an alloy ribbon 10 from an alloy ribbon wound body 11; a heating plate (heat transfer medium) 22 which heats the alloy ribbon 10 unwound from the unwinding roller 12; a cooling plate (heat transfer medium) 32 which cools the alloy ribbon 10 heated by the heating plate 22; and a winding roller 14 (winding unit) which winds up the alloy ribbon 10 a temperature of which is decreased by the cooling plate 32. In FIG. 1, the traveling direction of the alloy ribbon 10 is indicated by an arrow R.

The alloy ribbon wound body 11 is set on the unwinding roller 12.

The unwinding roller 12 axially rotates in the direction of an arrow U, whereby the alloy ribbon 10 is unwound from the alloy ribbon wound body 11.

In this example, the unwinding roller 12 may include a rotating mechanism (e.g., a motor) by itself; however, the unwinding roller 12 does not necessarily include a rotating mechanism.

Even when the unwinding roller 12 does not include a rotating mechanism by itself, the alloy ribbon 10 is unwound from the alloy ribbon wound body 11 set on the unwinding roller 12 in conjunction with the below-described actions of the winding roller 14 to wind up the alloy ribbon 10.

In FIG. 1, as illustrated in an enlarged circular part, the heating plate 22 includes a first flat surface 22S with which the alloy ribbon 10 unwound from the unwinding roller 12 travels in contact. This heating plate 22 heats the alloy ribbon 10 traveling on the first flat surface 22S in contact therewith, through the first flat surface 22S. By this, the traveling alloy ribbon 10 is stably and rapidly heated.

The heating plate 22 is connected to a heat source (not illustrated) and heated to a desired temperature by the heat supplied from this heat source. Instead of or in addition to being connected to the heat source, the heating plate 22 may include a heat source inside the heating plate 22 by itself.

Examples of the material of the heating plate 22 include stainless steel, Cu, Cu alloys, and Al alloys.

The heating plate 22 is housed in the heating chamber 20.

The heating chamber 20 may also include a heat source for controlling the temperature of the heating chamber, separately from the heat source for the heating plate 22.

The heating chamber 20 has openings (not illustrated) through which the alloy ribbon 10 enters or exits on each of the upstream side and the downstream side of the traveling direction (arrow R) of the alloy ribbon 10. The alloy ribbon 10 enters the heating chamber 20 through an inlet that is the opening on the upstream side, and exits the heating chamber 20 through an outlet that is the opening on the downstream side.

Further, in FIG. 1, as illustrated in another enlarged circular part, the cooling plate 32 includes a second flat surface 32S with which the alloy ribbon 10 travels in contact. This cooling plate 32 cools the alloy ribbon 10 traveling on the second flat surface 32S in contact therewith, through the second flat surface 32S.

The cooling plate 32 may include a cooling mechanism (e.g., a water cooling mechanism); however, the cooling plate 32 does not necessarily include a particular cooling mechanism.

Examples of the material of the cooling plate 32 include stainless steel, Cu, Cu alloys, and Al alloys.

The cooling plate 32 is housed in the cooling chamber 30.

The cooling chamber 30 may include a cooling mechanism (e.g., a water cooling mechanism); however, the cooling chamber 30 does not necessarily include a particular cooling mechanism. In other words, the mode of the cooling performed by the cooling chamber 30 may be water cooling or air cooling.

The cooling chamber 30 has openings (not illustrated) through which the alloy ribbon 10 enters or exits on each of the upstream side and the downstream side of the traveling direction (arrow R) of the alloy ribbon 10. The alloy ribbon 10 enters the cooling chamber 30 through an inlet that is the opening on the upstream side, and exits the cooling chamber 30 through an outlet that is the opening on the downstream side.

The winding roller 14 is equipped with a rotating mechanism (e.g., a motor) that axially rotates in the direction of an arrow W. By the rotation of the winding roller 14, the alloy ribbon 10 is wound up at a desired rate.

The in-line annealing apparatus 100 further includes, between the unwinding roller 12 and the heating chamber 20 and along the travel route of the alloy ribbon 10: a guide roller 41; a dancer roller 60 (a tensile stress adjuster); a guide roller 42; and a pair of guide rollers 43A and 43B. The tensile stress is also adjusted by controlling the actions of the unwinding roller 12 and the winding roller 14.

The dancer roller 60 is arranged in a movable manner along the vertical direction (the direction indicated by a double arrow in FIG. 1). The tensile stress of the alloy ribbon 10 can be adjusted by adjusting the position of this dancer roller 60 in the vertical direction. The same applies to a dancer roller 62.

The alloy ribbon 10 unwound from the unwinding roller 12 is guided into the heating chamber 20 via these guide rollers and dancer roller.

The in-line annealing apparatus 100 further includes, between the heating chamber 20 and the cooling chamber 30: a pair of guide rollers 44A and 44B; and a pair of guide rollers 45A and 45B.

The alloy ribbon 10 exiting the heating chamber 20 is guided into the cooling chamber 30 via these guide rollers.

The in-line annealing apparatus 100 further includes, between the cooling chamber 30 and the winding roller 14 and along the travel route of the alloy ribbon 10: a pair of guide rollers 46A and 46B; a guide roller 47; a dancer roller 62; a guide roller 48; a guide roller 49; and a guide roller 50.

The dancer roller 62 is arranged in a movable manner along the vertical direction (direction indicated by a double arrow in FIG. 1). The tensile stress of the alloy ribbon 10 can be adjusted by adjusting the position of this dancer roller 62 in the vertical direction.

The alloy ribbon 10 exiting the cooling chamber 30 is guided to the winding roller 14 via these guide rollers and dancer roller.

In the in-line annealing apparatus 100, the guide rollers arranged on the upstream side and the downstream side of the heating chamber 20 have a function of adjusting the position of the alloy ribbon 10 so as to bring the alloy ribbon 10 into contact with the entirety of the first flat surface of the heating plate 22.

In the in-line annealing apparatus 100, the guide rollers arranged on the upstream side and the downstream side of the cooling chamber 30 have a function of adjusting the position of the alloy ribbon 10 so as to bring the alloy ribbon 10 into contact with the entirety of the second flat surface of the cooling plate 32.

Figure 2:
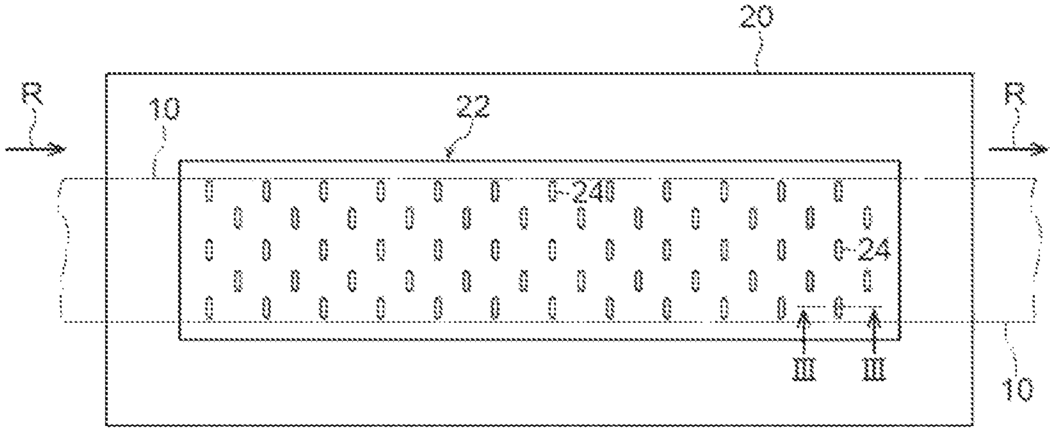
FIG. 2 is a schematic plan view illustrating a heat transfer medium of the in-line annealing apparatus illustrated in FIG. 1.
Figure 3:
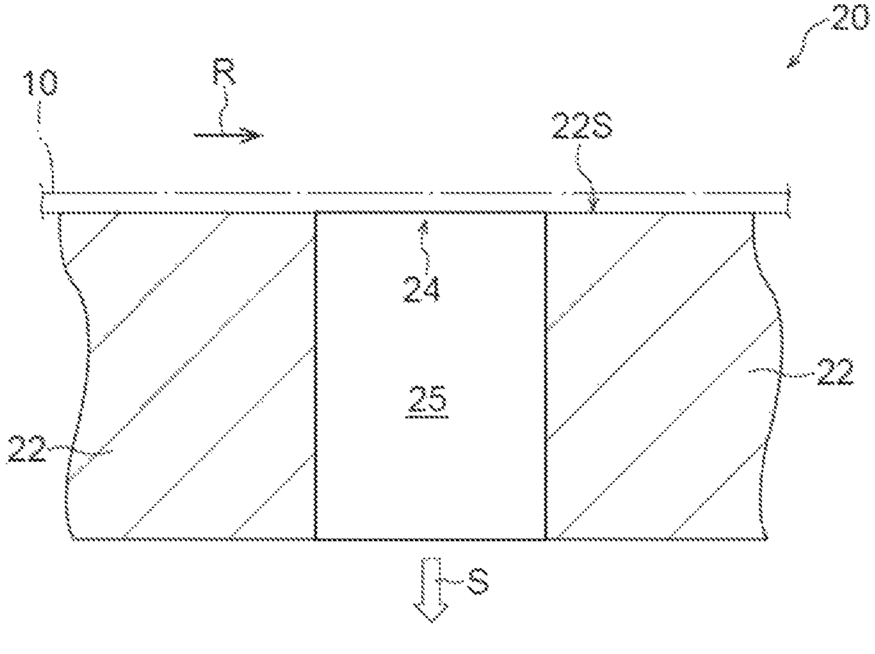
FIG. 3 is a cross-sectional view taken along a line of FIG. 2.

FIG. 2 is a schematic plan view illustrating the heating plate 22 of the in-line annealing apparatus 100 illustrated in FIG. 1, and FIG. 3 is a cross-sectional view taken along a line of FIG. 2.

As illustrated in FIGS. 2 and 3, on the first flat surface of the heating plate 22 (i.e. the surface coming into contact with the alloy ribbon 10), plural openings 24 (suction structure) are formed. The openings 24 each constitute one end of a through-hole 25 penetrating through the heating plate 22.

In this example, the plural openings 24 are arranged two-dimensionally over the entire region coming into contact with the alloy ribbon 10.

A concrete arrangement of the plural openings 24 is not restricted to the one illustrated in FIG. 2. As illustrated in FIG. 2, the plural openings 24 are preferably arranged two-dimensionally over the entire region coming into contact with the alloy ribbon 10.

Further, the shape of each opening 24 is an elongated shape having a parallel section (two parallel sides). The lengthwise direction of each opening 24 is the direction perpendicular to the traveling direction of the alloy ribbon 10.

The shape of each opening 24 is not restricted to the one illustrated in FIG. 2, and various shapes other than the shape illustrated in FIG. 2, such as elongated shapes, elliptical shapes (including circular shapes), polygonal shapes (e.g., rectangular shapes) can be adopted.

In the in-line annealing apparatus 100, by removing the air from the internal spaces of the through-holes 25 (see an arrow S) using a suction device (not illustrated; e.g., a vacuum pump), the traveling alloy ribbon 10 can be suctioned onto the first flat surface 22S of the heating plate 22 on which the openings 24 are arranged. As a result, the traveling alloy ribbon 10 can be more stably brought into contact with the first flat surface 22S of the heating plate 22.

In this example, the through-holes 25 each penetrate through the heating plate 22 from the first flat surface 22S to a flat surface on the opposite side of the first flat surface 22S. The through-holes may penetrate from the first flat surface 22S to a side surface of the heating plate 22.

Figure 4:
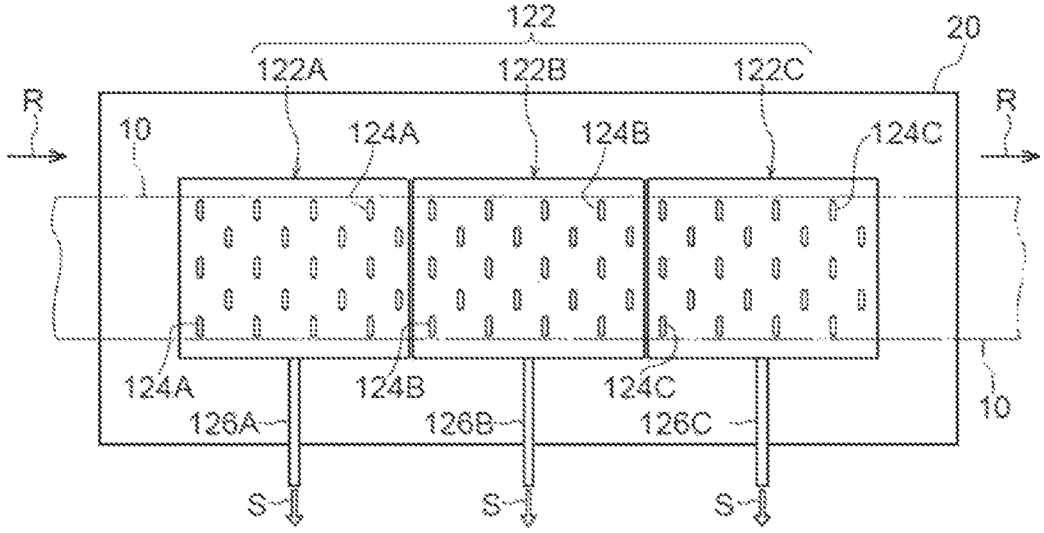
FIG. 4 is a schematic plan view illustrating a modification example of the heat transfer medium.

FIG. 4 is a schematic plan view illustrating a modification example of the heating plate used in the present embodiment (heating plate 122).

As illustrated in FIG. 4, in this modification example, the heating plate 122 is divided into three regions (regions 122A to 122C) along the traveling direction (arrow R) of the alloy ribbon 10.

In the regions 122A to 122C, in the same manner as in the heating plate 22 illustrated in FIG. 2, plural openings 124A, 124B and 124C are arranged, respectively, in a two-dimensional manner over the entirety of each region coming into contact with the alloy ribbon 10. The openings 124A, 124B and 124C each constitute one end of a through-hole penetrating through the heating plate 122 and, to the plural through-holes of these regions, exhaust pipes 126A, 126B and 126C, which are in communication with the respective plural through-holes, are attached. Further, by removing the air from the internal spaces of the through-holes (see an arrow S) through these exhaust pipes 126A, 126B and 126C using a suction device (not illustrated; e.g., a vacuum pump), the traveling alloy ribbon 10 can be suctioned onto the first flat surface of the heating plate 122 on which the openings 124A, 124B and 124C are arranged.

—Preferable Mode of Temperature-Increasing and Temperature-Decreasing—

One preferable mode of the temperature-increasing and the temperature-decreasing is, for example, a mode in which, using an in-line annealing apparatus equipped with heat transfer media, an amorphous alloy ribbon is produced by thermal-treating an alloy ribbon by bringing the alloy ribbon into contact with a heat transfer medium for temperature-increasing and a heat transfer medium for temperature-decreasing, surfaces of which coming into contact with the alloy ribbon are positioned in the same plane, while applying a tension to the alloy ribbon (this mode is hereinafter referred to as "mode X").

An amorphous alloy ribbon piece can be obtained by cutting out the thus produced amorphous alloy ribbon.

The cutting out of the amorphous alloy ribbon piece (i.e. cutting of the amorphous alloy ribbon) can be performed by a known cutting means, such as shirring.

In the above-described process of obtaining an amorphous alloy ribbon, when a wound body is prepared by winding up the resulting amorphous alloy ribbon, the step of cutting out an amorphous alloy ribbon piece is performed by unwinding the amorphous alloy ribbon from the wound body of the amorphous alloy ribbon and then cutting out the amorphous alloy ribbon piece from the thus unwound amorphous alloy ribbon.

EXAMPLES

The invention will now be described more concretely by way of examples thereof; however, the invention is not restricted to the following examples as long as they do not depart from the gist of the invention.

Examples 1 and 2, and Comparative Examples 1 to 5

<Production of Amorphous Alloy Ribbons>

By a liquid quenching method of ejecting a molten alloy onto an axially rotating temperature-decreasing roll, amorphous alloy ribbons of 30 mm in width and 25 μm in thickness, which had a composition of $Fe_{80.8}Si_{3.9}B_{15.3}C_{0.32}$ (atom %; Example 1 and Comparative Examples 1 and 2), $Fe_{81.3}Si_{4.0}B_{14.7}C_{0.25}$ (atom %; Example 2 and Comparative Examples 3 and 4) or $Fe_{81.0}Si_{81.0}B_{11.8}C_{0.30}$ (atom %; Comparative Example 5), were produced.

Next, using an in-line annealing apparatus including a heat transfer medium in a heating chamber, which apparatus was configured in the same manner as illustrated in FIG. 1, the thus obtained amorphous alloy ribbons were each, in a tensioned state, introduced into the heating chamber and brought into contact with the heat transfer medium to perform a thermal treatment in the above-described mode X. The thermal treatment was performed with the temperature of the heat transfer medium being changed in the below-described respective ranges. Then, the amorphous alloy ribbons were each introduced into a cooling chamber to decrease its temperature to 25° C. from a highest temperature reached during the temperature-increasing. The average temperature increase rate and the average temperature decrease rate in the thermal treatment were as shown in Tables 1 to 3. The thus thermal-treated amorphous alloy ribbons were each subsequently allowed to exit the cooling chamber. Thereafter, the resulting amorphous alloy ribbons were each wound up to obtain wound bodies.

The production conditions were as follows.

<Production Conditions>

Heat transfer media: bronze plates

Target maximum temperature (temperature of heat transfer medium for temperature-increasing): see Tables 1 to 3 below Tensile stress applied to amorphous alloy ribbon: 25 MPa In-line annealing rate: 0.2 m/sec Contact time of amorphous alloy ribbon with heat transfer medium for temperature-increasing: 6.0 seconds Contact time of amorphous alloy ribbon with heat transfer medium for temperature-decreasing: 6.0 seconds Average temperature increase rate: see Tables 1 to 3 below Average temperature decrease rate: see Tables 1 to 3 below The temperature of the heat transfer medium for temperature-increasing and that of the heat transfer medium for temperature-decreasing were measured by thermocouples arranged on the surfaces of the respective heat transfer media with which the alloy ribbon came into contact.

The average temperature increase rate was determined by dividing a difference between the temperature of each amorphous alloy ribbon, which was measured using a radiation thermometer at 10 mm upstream of the inlet of the heating chamber 20 in the traveling direction of the amorphous alloy ribbon (the ribbon temperature prior to heating=usually a room temperature, which was 25° C. in the present Examples), and the target maximum temperature (=the temperature of the heat transfer medium for temperature-increasing (heating plate 22 in FIG. 1); set at 350° C. to 530° C.) by a duration (seconds) for which the amorphous alloy ribbon was in contact with the heat transfer medium.

The average temperature decrease rate was determined by dividing a difference between the temperature of the heat transfer medium for temperature-increasing (heating plate 22 in FIG. 1) (=target maximum temperature) and the temperature of the heat transfer medium for temperature-decreasing (cooling plate 32 in FIG. 1; 25° C.) in the traveling direction of the amorphous alloy ribbon by a duration (seconds) from a point when the amorphous alloy ribbon left the heat transfer medium for temperature-increasing to a point when the amorphous alloy ribbon left the heat transfer medium for temperature-decreasing.

It is noted here that, in in-line annealing, the average temperature increase rate can be controlled by changing the temperature of the heat transfer medium for temperature-increasing (=target maximum temperature) when the traveling speed of the amorphous alloy ribbon is constant, i.e. when the contact time of the amorphous alloy ribbon with the heat transfer medium for temperature-increasing is constant. For example, when the in-line annealing rate is 0.5 m/sec as shown in Table 4 below, the average temperature increase rate can be controlled to be in a range of from 148° C./sec to 202° C./sec by changing the temperature of the heat transfer medium for temperature-increasing (=target maximum temperature of amorphous alloy ribbon) in a range of from 380° C. to 510° C. with the temperature of the alloy ribbon before the temperature-increasing being set at 25° C. and the contact time of the alloy ribbon with the heat transfer medium for temperature-increasing being set at 2.4 seconds.

<Production of Amorphous Alloy Ribbon Pieces>

Next, from a wound body of each amorphous alloy ribbon subjected to the in-line annealing, the amorphous alloy ribbon was unwound, and an amorphous alloy ribbon piece having a longitudinal length of 280 mm was cut out from the thus unwound amorphous alloy ribbon. The cutting of the amorphous alloy ribbon was done by shirring.

<Measurement and Evaluation>

For each of the amorphous alloy ribbons produced in Examples and Comparative Examples, the brittleness indices (cuttability, 180°-bending test, and strip tear ductility)

were evaluated by the following methods. The results thereof are shown in Tables 1 to 3.

—First Brittleness Index: Cuttability—

Plural amorphous alloy ribbons, which were produced by changing the average temperature increase rate or the average temperature decrease rate and the target maximum temperature based on the temperatures of the heat transfer media, were each cut with stainless-steel scissors (product name: WESTCOTT 8" All Purpose Preferred Stainless Steel Scissors, manufactured by Westcott). In this process, the presence or absence of cuttability was evaluated based on the following criterial.

<Evaluation Criteria>

Present: The amorphous alloy ribbon was substantially linearly divided, with a non-linear broken part being not more than 5% of the whole cut dimensions.

Absent: A non-linear broken part was more than 5% of the whole cut dimensions.

—Second Brittleness Index: 180°-Bending Test—

Plural amorphous alloy ribbons, which were produced by changing the average temperature increase rate or the average temperature decrease rate and the target maximum temperature based on the temperatures of the heat transfer media, were subjected to a 180°-bending test where each amorphous alloy ribbon was bent by 180° with its glossy surface (surface freely solidified during casting) facing the outside, as well as a 180°-bending test where each amorphous alloy ribbon was bent by 180° with its non-glossy surface (surface in contact with the cooling roll during casting) facing the outside. The presence or absence of a broken part generated in the bent portion of each alloy ribbon was visually observed and evaluated based on the following criteria.

<Evaluation Criteria>

Absent: No broken part was generated in the bent portion of the alloy ribbon.

Present: A broken part was generated in the bent portion of the alloy ribbon.

—Third Brittleness Index: Strip Tear Ductility—The alloy ribbons having a width of 76.2 mm or greater were evaluated by the method prescribed in JIS C2534 (2017) 8.4.4.2. Further, the alloy ribbons having a width of from 20 mm to less than 76.2 mm were evaluated by the below-described method.

—Coercivity ($H_c$)—

The coercivity ($H_c$) was determined from a hysteresis curve measured at a magnetic field intensity of 800 A/m using a direct-current magnetization analyzer SK110 (manufactured by METRON, Inc.).

TABLE 1

$Fe_{80.8}Si_{3.9}B_{15.3}C_{0.32}$ (% by atom)

| | Highest attained temperature [° C.] | Average temperature increase rate [° C./sec] | Average temperature decrease rate [° C./sec] | $H_C$ [A/m] | Cuttability | 180°-bending test: Bending with glossy surface on the outside | 180°-bending test: Bending with non-glossy surface on the outside | Brittleness code |
|---|---|---|---|---|---|---|---|---|
| Comparative Example 1 | 400 | 63 | 188 | 1.60 | present | absent | absent | 1 |
| Example 1 | 410 | 64 | 193 | 1.00 | present | absent | absent | 1 |
| | 420 | 66 | 198 | 0.80 | present | absent | absent | 3 |
| | 430 | 68 | 203 | 0.80 | present | absent | present | 4 |
| | 440 | 69 | 208 | 0.70 | present | absent | present | 5 |
| | 450 | 71 | 213 | 0.70 | present | absent | present | 5 |
| | 460 | 73 | 218 | 0.70 | present | absent | present | 5 |
| | 470 | 74 | 223 | 0.70 | present | absent | present | 5 |
| | 480 | 76 | 228 | 0.80 | present | present | present | 5 |
| Comparative Example 2 | 490 | 78 | 233 | 1.20 | present | present | present | 5 |

TABLE 2

$Fe_{81.3}Si_{4.0}B_{14.7}C_{0.25}$ (% by atom)

| | Highest attained temperature [° C.] | Average temperature increase rate [° C./sec] | Average temperature decrease rate [° C./sec] | $H_C$ [A/m] | Cuttability | 180°-bending test: Bending with glossy surface on the outside | 180°-bending test: Bending with non-glossy surface on the outside | Brittleness code |
|---|---|---|---|---|---|---|---|---|
| Comparative Example 3 | 380 | 59 | 178 | 1.10 | present | absent | absent | 1 |
| Example 2 | 410 | 64 | 193 | 0.70 | present | absent | absent | 2 |
| | 420 | 66 | 198 | 0.60 | present | absent | present | 4 |
| | 430 | 68 | 203 | 0.60 | present | absent | present | 5 |
| | 440 | 69 | 208 | 0.50 | present | absent | present | 5 |
| | 450 | 71 | 213 | 0.60 | present | absent | present | 5 |
| | 460 | 73 | 218 | 0.70 | present | absent | present | 5 |

TABLE 2-continued

| $Fe_{81.3}Si_{4.0}B_{14.7}C_{0.25}$ (% by atom) | | | | | | | | |
|---|---|---|---|---|---|---|---|---|
| | | | | | | 180°-bending test | | |
| | Highest attained temperature [° C.] | Average temperature increase rate [° C./sec] | Average temperature decrease rate [° C./sec] | $H_C$ [A/m] | Cuttability | Bending with glossy surface on the outside | Bending with non-glossy surface on the outside | Brittle-ness code |
| | 470 | 74 | 223 | 0.80 | present | absent | present | 5 |
| | 480 | 76 | 228 | 0.90 | present | absent | present | 5 |
| Comparative Example 4 | 500 | 79 | 238 | 2.00 | absent | present | present | 5 |

TABLE 3

| $Fe_{80.1}Si_{8.1}B_{11.8}C_{0.30}$ (% by atom) | | | | | | | | |
|---|---|---|---|---|---|---|---|---|
| | | | | | | 180°-bending test | | |
| | Highest attained temperature [° C.] | Average temperature increase rate [° C./sec] | Average temperature decrease rate [° C./sec] | $H_C$ [A/m] | Cuttability | Bending with glossy surface on the outside | Bending with non-glossy surface on the outside | Brittle-ness code |
| Comparative Example 5 | 410 | 64 | 193 | 2.40 | present | absent | absent | 3 |
| | 420 | 66 | 198 | 1.75 | present | present | present | 5 |
| | 430 | 68 | 203 | 1.40 | present | present | present | 5 |
| | 440 | 69 | 208 | 1.25 | present | present | present | 5 |
| | 450 | 71 | 213 | 1.10 | present | present | present | 5 |
| | 460 | 73 | 218 | 1.20 | present | present | present | 5 |
| | 470 | 74 | 223 | 1.20 | absent | present | present | 5 |
| | 480 | 76 | 228 | 1.50 | absent | present | present | 5 |

As shown in Tables 1 and 2, in those cases where the composition had an Fe amount of 80.5 atom % or greater and the target maximum temperature was 480° C. or lower, amorphous alloy ribbons having cuttability were obtained.

As shown in Table 1, with the alloy composition being $Fe_{80.8}Si_{3.9}B_{15.3}C_{0.32}$, in Example 1, under the conditions where the target maximum temperature was from 410 to 480° C., the average temperature increase rate was from 64 to 76° C./sec and the average temperature decrease rate was from 193 to 228° C./sec, the resulting amorphous alloy ribbon had cuttability and a coercivity $H_c$ of 1.00 A/m or lower. Under the conditions where the target maximum temperature was 410° C., the average temperature increase rate was 64° C./sec and the average temperature decrease rate was 193° C./sec, no broken part was observed in the 180°-bending test. Further, with regard to the strip tear ductility, a favorable brittleness code of 1 was obtained. When the target maximum temperature was 420° C., the coercivity $H_c$ was small at 0.80, and no broken part was observed in the 180°-bending test. Moreover, with regard to the strip tear ductility, a favorable brittleness code of 3 was obtained.

On the other hand, in Comparative Example 1, since the target maximum temperature was low at 400° C. (lower than 410° C.), the coercivity was high at 1.60 A/m, exceeding 1.0 A/m. Further, in Comparative Example 2, the was high at 1.20 A/m due to the target maximum temperature of 490° C., which is higher than 480° C. The resulting amorphous alloy ribbon had cuttability; however, a broken part was observed in the 180°-bending test and, with regard to the strip tear ductility, the brittleness code was 5. Therefore, this ribbon was found to be brittle.

As shown in Table 2, with the alloy composition being $Fe_{81.3}Si_{4.0}B_{14.7}C_{0.25}$, in Example 2, under the conditions where the target maximum temperature was from 410 to 480° C., the average temperature increase rate was from 64 to 76° C./sec and the average temperature decrease rate was from 193 to 228° C./sec, the resulting amorphous alloy ribbon had cuttability and a coercivity $H_c$ of 0.90 A/m or lower. Under the conditions where the target maximum temperature was 410° C., the average temperature increase rate was 64° C./sec and the average temperature decrease rate was 193° C./sec, the coercivity was low at 0.70 A/m, and no broken part was observed in the 180°-bending test. Further, with regard to the strip tear ductility, a favorable brittleness code of 2 was obtained.

On the other hand, in Comparative Example 3, since the thermal treatment temperature was low with the target maximum temperature being lower than 380° C., the coercivity was high at 1.10 A/m, exceeding 1.0 A/m. In Comparative Example 4, the $H_c$ was high at 2.00 A/m since the target maximum temperature in the thermal treatment was 500° C., which is higher than 480° C. Further, this ribbon was found to be brittle with no cuttability.

Comparative Example 5 shown in Table 3 is an example where the alloy composition deviated from Compositional Formula (A), and the resulting amorphous alloy ribbon exhibited a high $H_c$ value of not less than 1.10 under all of the thermal treatment conditions.

As described above, by adopting an alloy composition satisfying Compositional Formula (A) ($Fe_{100-a-b}B_aSi_bC_c$) and thermal-treating such amorphous alloy ribbons in a state of being tensioned with a tensile stress in a specific range while maintaining a certain target maximum temperature with specific average temperature increase rate and average temperature decrease rate, amorphous alloy ribbons having excellent magnetic properties (low coercivity $H_c$) and cuttability, i.e. amorphous alloy ribbons with suppressed embrittlement, were obtained.

Examples 3 to 5 and Comparative Examples 6 to 11

By a liquid quenching method of ejecting a molten alloy onto an axially rotating cooling roll, amorphous alloy ribbons of 142.2 mm in width and 25 μm in thickness, which had a composition of $Fe_{81.7}Si_{3.7}B_{14.6}C_{0.28}$ (atom %), were produced.

Next, according to the above-described mode X, using an in-line annealing apparatus equipped with heat transfer media, a thermal treatment was performed on the thus obtained amorphous alloy ribbons by bringing each amorphous alloy ribbon into contact with a heat transfer medium, with the target maximum temperature and the in-line annealing treatment rate being set as shown in Tables 5 to 7. The thus thermal-treated amorphous alloy ribbons were each allowed to exit the heat transfer medium, and subsequently its temperature was decreased to a room temperature (25° C.) using a heat transfer medium for temperature-decreasing in the cooling chamber 30. Thereafter, the resulting amorphous alloy ribbons were each wound up to obtain wound bodies. The production conditions were as shown below.

Then, in the same manner as in Example 1, amorphous alloy ribbon pieces were produced, measured and evaluated. The results thereof are shown in Tables 5 to 7 below.

<Production Conditions>

Heat transfer media: bronze plates (heat transfer medium for temperature-increasing: temperature-increasing plate, temperature of the heat transfer medium for temperature-decreasing-decreasing plate)

Temperature of heat transfer media: see Tables 5 to 7 below

Tensile stress applied to amorphous alloy ribbon: 40 MPa

Contact time of amorphous alloy ribbon with each heat transfer medium: see Table 4 below Average temperature increase rate: see Tables 5 to 7 below Average temperature decrease rate: see Tables 5 to 7 below Target maximum temperature (temperature of heat transfer medium for temperature-increasing): see Tables 5 to 7 below

TABLE 4

| Temperature-increasing | | |
|---|---|---|
| In-line annealing rate (m/sec) | Length of heating plate (m) | Contact time (sec)*1 |
| 0.5 | 1.2 | 2.4 |
| 1 | 1.2 | 1.2 |
| 1.5 | 1.2 | 0.8 |
| **Temperature-decreasing** | | |
| In-line annealing rate (m/sec) | Length of cooling plate (m) | Temperature-decreasing time (sec)*2 |
| 0.5 | 1.2 | 3.2 |
| 1 | 1.2 | 1.6 |
| 1.5 | 1.2 | 1.1 |

*1 Duration for which the alloy ribbon was in contact with the heating plate

*2 Duration from a point when the alloy ribbon left the heating plate to a point when the alloy ribbon left the cooling plate

TABLE 5

| $Fe_{81.7}Si_{3.7}B_{14.6}C_{0.28}$ (% by atom) (treatment rate: 0.5 m/sec) | | | | | | | | |
|---|---|---|---|---|---|---|---|---|
| | | | | | | 180°-bending test | | |
| | Highest attained temperature [° C.] | Average temperature increase rate [° C./sec] | Average temperature decrease rate [° C./sec] | $H_C$ [A/m] | Cuttability | Bending with glossy surface on the outside | Bending with non-glossy surface on the outside | Brittleness code |
| Comparative Example 6 | 380 | 148 | 111 | 1.10 | present | absent | absent | 1 |
| Example 3 | 410 | 160 | 120 | 0.70 | present | absent | absent | 3 |
| | 420 | 165 | 123 | 0.65 | present | absent | present | 4 |
| | 430 | 169 | 127 | 0.65 | present | absent | present | 4 |
| | 440 | 173 | 130 | 0.50 | present | absent | present | 5 |
| | 450 | 177 | 133 | 0.70 | present | absent | present | 5 |
| | 460 | 181 | 136 | 0.60 | present | absent | present | 5 |
| | 470 | 185 | 139 | 0.65 | present | absent | present | 5 |
| | 480 | 190 | 142 | 0.70 | present | absent | present | 5 |
| Comparative Example 7 | 510 | 202 | 152 | 0.80 | absent | present | present | 5 |

60

TABLE 6

$Fe_{81.7}Si_{3.7}B_{14.6}C_{0.28}$ (% by atom) (treatment rate: 1.0 m/sec)

| | Highest attained temperature [° C.] | Average temperature increase rate [° C./sec] | Average temperature decrease rate [° C./sec] | $H_C$ [A/m] | Cuttability | 180°-bending test: Bending with glossy surface on the outside | 180°-bending test: Bending with non-glossy surface on the outside | Brittleness code |
|---|---|---|---|---|---|---|---|---|
| Comparative Example 8 | 390 | 304 | 228 | 1.10 | present | absent | absent | 1 |
| Example 4 | 410 | 321 | 241 | 0.90 | present | absent | absent | 1 |
| | 420 | 329 | 247 | 0.80 | present | absent | absent | 1 |
| | 430 | 338 | 253 | 0.70 | present | absent | absent | 2 |
| | 440 | 346 | 259 | 0.75 | present | absent | absent | 2 |
| | 450 | 354 | 266 | 0.75 | present | absent | absent | 3 |
| | 460 | 363 | 272 | 0.65 | present | absent | present | 4 |
| | 470 | 371 | 278 | 0.65 | present | absent | present | 5 |
| | 480 | 379 | 284 | 0.60 | present | absent | present | 5 |
| Comparative Example 9 | 510 | 404 | 303 | 0.80 | absent | present | present | 5 |

TABLE 7

$Fe_{81.7}Si_{3.7}B_{14.6}C_{0.28}$ (% by atom) (treatment rate: 1.5 m/sec)

| | Highest attained temperature [° C.] | Average temperature increase rate [° C./sec] | Average temperature decrease rate [° C./sec] | $H_C$ [A/m] | Cuttability | 180°-bending test: Bending with glossy surface on the outside | 180°-bending test: Bending with non-glossy surface on the outside | Brittleness code |
|---|---|---|---|---|---|---|---|---|
| Comparative Example 10 | 390 | 456 | 332 | 2.00 | present | absent | absent | 1 |
| Example 5 | 440 | 519 | 377 | 0.85 | present | absent | absent | 1 |
| | 450 | 531 | 386 | 0.75 | present | absent | absent | 2 |
| | 460 | 544 | 395 | 0.70 | present | absent | absent | 3 |
| | 470 | 556 | 405 | 0.70 | present | absent | present | 4 |
| | 480 | 569 | 414 | 0.65 | present | absent | present | 4 |
| Comparative Example 11 | 530 | 631 | 459 | 1.00 | absent | present | present | 5 |

In Tables 5 to 7, the alloy composition was the same; however, the thermal treatment conditions were modified in terms of the average temperature increase rate and the average temperature decrease rate by changing the treatment rate (transfer rate of each amorphous alloy ribbon) to 0.5 m/sec, 1.0 m/sec, or 1.5 m/sec.

In Example 3 shown in Table 5, the amorphous alloy ribbons, which were obtained under the conditions where the target maximum temperature was from 410 to 480° C., the average temperature increase rate was from 160 to 190° C./sec and the average temperature decrease rate was from 120 to 142° C./sec, had a of 0.70 A/m or lower and cuttability. The amorphous alloy ribbon, which was obtained under the conditions where the target maximum temperature was 410° C., the average temperature increase rate was 160° C./sec and the average temperature decrease rate was from 120° C./sec, had a low $H_c$ of 0.70 A/m and was observed with no broken part in the 180°-bending test. Further, this amorphous alloy ribbon had a favorable brittleness code of 3 in the evaluation of the strip tear ductility. In Example 3, a magnetic anisotropy was provided by the thermal treatment performed at a target maximum temperature of 410° C. or higher with a tensile stress being applied, as a result which a low $H_c$ was attained. It is thus unnecessary to perform a treatment in a magnetic field for imparting the amorphous alloy ribbons with a magnetic anisotropy as a post-treatment.

On the other hand, in Comparative Example 6, since the target maximum temperature was low at 380° C. (lower than 410° C.), the coercivity was high at 1.10 A/m, exceeding 1.0 A/m. In Comparative Example 7, the amorphous alloy ribbon had no cuttability since the target maximum temperature was high 510° C. (higher than 480° C.).

In Example 4 shown in Table 6, the amorphous alloy ribbons, which were obtained under the conditions where the target maximum temperature was from 410 to 480° C., the average temperature increase rate was from 321 to 379° C./sec and the average temperature decrease rate was from 241 to 284° C./sec, had a of 0.90 A/m or lower and cuttability. The amorphous alloy ribbon, which was obtained under the conditions where the target maximum temperature was 410° C., the average temperature increase rate was 321° C./sec and the average temperature decrease rate was from 241° C./sec, was observed with no broken part in the 180°-bending test. Further, this amorphous alloy ribbon had a favorable brittleness code of 1 in the evaluation of the strip tear ductility. The amorphous alloy ribbon, which was obtained under the conditions where the target maximum temperature was 420° C., the average temperature increase rate was 329° C./sec and the average temperature decrease rate was from 247° C./sec, had a low $H_c$ of 0.80 A/m and was observed with no broken part in the 180°-bending test. Further, this amorphous alloy ribbon had a favorable brittleness code of 1 in the evaluation of the strip tear ductility. The amorphous alloy ribbon, which was obtained under the conditions where the target maximum temperature was 440° C., the average temperature increase rate was 346° C./sec and the average temperature decrease rate was from 259° C./sec, had a low $H_c$ of 0.75 A/m and was observed with no broken part in the 180°-bending test. Further, this amorphous alloy ribbon had a favorable brittleness code of 2 in the evaluation of the strip tear ductility. The amorphous alloy ribbon, which was obtained under the conditions where the target maximum temperature was 450° C., the average temperature increase rate was 354° C./sec and the average temperature decrease rate was from 266° C./sec, had a low $H_c$ of 0.75 A/m and was observed with no broken part in the 180°-bending test. Further, this amorphous alloy ribbon had a favorable brittleness code of 3 in the evaluation of the strip tear ductility. In Example 4 as well, in the same manner as in Example 3, a magnetic anisotropy was provided by the thermal treatment performed at a target maximum temperature of 410° C. or higher under a tensile stress, as a result which a low was attained. It is thus unnecessary to perform a treatment in a magnetic field for imparting the amorphous alloy ribbons with a magnetic anisotropy as a post-treatment.

On the other hand, in Comparative Example 8, since the target maximum temperature was low at 390° C. (lower than 410° C.), the coercivity was high at 1.10 A/m, exceeding 1.0 A/m. In Comparative Example 9, the amorphous alloy ribbon had no cuttability since the target maximum temperature was high 510° C. (higher than 480° C.).

In Example 5 shown in Table 7, the amorphous alloy ribbons, which were obtained under the conditions where the target maximum temperature was from 440 to 480° C., the average temperature increase rate was from 519 to 569° C./sec and the average temperature decrease rate was from 377 to 414° C./sec, had a of 0.85 A/m or lower and cuttability. The amorphous alloy ribbon, which was obtained under the conditions where the target maximum temperature was 440° C., the average temperature increase rate was 519° C./sec and the average temperature decrease rate was from 377° C./sec, was observed with no broken part in the 180°-bending test. Further, this amorphous alloy ribbon had a favorable brittleness code of 1 in the evaluation of the strip tear ductility. The amorphous alloy ribbon, which was obtained under the conditions where the target maximum temperature was 450° C., the average temperature increase rate was 531° C./sec and the average temperature decrease rate was from 386° C./sec, had a low $H_c$ of 0.75 A/m and was observed with no broken part in the 180°-bending test. Further, this amorphous alloy ribbon had a favorable brittleness code of 2 in the evaluation of the strip tear ductility. In Example 5 as well, in the same manner as in Example 3, a magnetic anisotropy was provided by the thermal treatment performed at a target maximum temperature of 410° C. or higher under a tensile stress, as a result which a low was attained. It is thus unnecessary to perform a treatment in a magnetic field for imparting the amorphous alloy ribbons with a magnetic anisotropy as a post-treatment.

On the other hand, in Comparative Example 10, since the target maximum temperature was low at 390° C. (lower than 410° C.), the coercivity was high at 2.00 A/m, exceeding 1.0 A/m. In Comparative Example 11, the amorphous alloy ribbon had no cuttability since the target maximum temperature was high 530° C. (higher than 480° C.).

The disclosure of U.S. Provisional Application No. 62/528,450 filed on Jul. 4, 2017 is incorporated herein by reference in its entirety.

All documents, patent applications, and technical standards described in the present specification are incorporated into the present specification to the same extent in a case where each individual document, patent application, and technical standard was specifically and individually indicated to be incorporated by reference.

The invention claimed is:

1. A method of producing an amorphous alloy ribbon, the method comprising the steps of:

preparing an amorphous alloy ribbon having a composition represented by the following Compositional Formula (A) and consisting of Fe, Si, B, C, and unavoidable impurities;

increasing a temperature of the amorphous alloy ribbon to a target maximum temperature that is in a range of from 410° C. to 480° C., at an average temperature increase rate of from 50° C./sec to less than 800° C./sec, in a state in which the amorphous alloy ribbon continuously travels in a tensioned state with a tensile stress of from 5 MPa to 100 MPa; and decreasing a temperature of the thus heated amorphous alloy ribbon from the target maximum temperature to a temperature of a cooling plate for temperature-decreasing, at an average temperature decrease rate of from 120° C./sec to less than 600° C./sec, in a state in which the amorphous alloy ribbon continuously travels in a tensioned state with a tensile stress of from 5 MPa to 100 MPa, the increase of temperature in the temperature increasing step and the decrease of a temperature in the temperature decreasing step being performed by allowing the amorphous alloy ribbon to continuously travel in a tensioned state and in a state in which the amorphous alloy ribbon that is continuously traveling contacts a contact surface of a heating plate or the cooling plate, wherein the heating plate comprises a first plane on which the amorphous alloy ribbon continuously travels while in contact with the heating plate and wherein only one side of the amorphous alloy ribbon comes into contact with the first plane of the heating plate, thereby heating the amorphous alloy ribbon, wherein the amorphous alloy ribbon is vacuum-suctioned onto the first plane of the heating plate through suction holes which are arranged on the heating plate during heating, wherein the cooling plate comprises a second plane on which the amorphous alloy ribbon continuously travels while in contact, wherein only one side of the amorphous alloy ribbon comes into contact with the second plane of the cooling plate, thereby cooling the amorphous alloy ribbon, and wherein there is nothing in contact with the other side of the amorphous alloy ribbon during cooling, and wherein Compositional Formula (A) has the following formula: $Fe_{100-a-b}B_aSi_bC_c$ wherein a and b each represent an atomic fraction in the composition and satisfy the following respective ranges, and c represents an atomic fraction of C with respect to a total of 100.0 atom % of Fe, Si and B, and satisfies the following range:

13.0 atom %≤a≤16.0 atom %, 2.5 atom %≤b≤5.0 atom %, 0.20 atom %≤c≤0.35 atom %, and 79.0 atom %≤(100-a-b)≤83.0 atom %.

2. The method of producing an amorphous alloy ribbon according to claim 1, wherein the average temperature increase rate is from 60° C./sec to 760° C./sec, and the average temperature decrease rate is from 190° C./sec to 500° C./sec.

3. The method of producing an amorphous alloy ribbon according to claim 1, wherein, in the temperature increasing step and the temperature decreasing step, the tensile stress is from 10 MPa to 75 MPa.

4. The method of producing an amorphous alloy ribbon according to claim 1, wherein the b satisfies the following range:

3.0 atom %≤b≤4.5 atom %.

5. The method of producing an amorphous alloy ribbon according to claim 1, wherein the (100-a-b) satisfies the following range:

80.5 atom %≤(100-a-b)≤83.0 atom %.

6. The method of producing an amorphous alloy ribbon according to claim 1, wherein the a satisfies the following range:

14.0 atom %≤a≤16.0 atom %.

7. The method of producing an amorphous alloy ribbon according to claim 1, wherein a contact surface of the heating plate that increases the temperature of the amorphous alloy ribbon that is continuously traveling and a contact surface of the cooling plate that decreases the temperature of the amorphous alloy ribbon that is continuously traveling are arranged in a flat plane.

* * * * *